(12) United States Patent
Guler et al.

(10) Patent No.: US 7,702,564 B2
(45) Date of Patent: Apr. 20, 2010

(54) DETERMINING A DEMAND FUNCTION FOR AN ITEM

(75) Inventors: Kemal Guler, Cupertino, CA (US);
Tongw ei Liu, Brooklyn, NY (US);
Hsiu-Khuem Tang, Menlo Park, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1402 days.

(21) Appl. No.: 10/175,661

(22) Filed: Jun. 19, 2002

(65) Prior Publication Data

US 2003/0236734 A1    Dec. 25, 2003

(51) Int. Cl.
*G06F 17/60* (2006.01)
(52) U.S. Cl. .......................................... 705/37; 705/26
(58) Field of Classification Search .............. 705/37
See application file for complete search history.

(56) References Cited

U.S. PATENT DOCUMENTS

| | | | | |
|---|---|---|---|---|
| 5,394,324 A | * | 2/1995 | Clearwater | 705/8 |
| 5,749,785 A | * | 5/1998 | Rossides | 463/25 |
| 6,243,691 B1 | * | 6/2001 | Fisher et al. | 705/37 |
| 6,985,885 B1 | * | 1/2006 | Goldberg et al. | 705/37 |
| 7,058,602 B1 | * | 6/2006 | La Mura et al. | 705/37 |
| 2001/0009005 A1 | * | 7/2001 | Godin et al. | 705/37 |
| 2003/0033236 A1 | * | 2/2003 | Davenport et al. | 705/37 |
| 2005/0256800 A1 | * | 11/2005 | Hogg et al. | 705/37 |

OTHER PUBLICATIONS

Business wire, Siebel systems acquires opensite Inc., Apr. 18, 2000.*
San Mateo, California (Business Wire), Apr. 18, 2000, Siebel Systems, Inc.*

* cited by examiner

*Primary Examiner*—Matthew S Gart
*Assistant Examiner*—Garcia Ade

(57) ABSTRACT

An embodiment in accordance with the present invention provides a method for determining a demand function for an item. For example, the method includes determining a first estimate of the demand function for the item by utilizing a first auction having a first set of auction parameters. Additionally, the method includes determining a second estimate of the demand function for the item by utilizing a second auction using auction data from the first auction. The second auction has a second set of auction parameters based on the first estimate of the demand function.

10 Claims, 6 Drawing Sheets

DETERMINING A DEMAND FUNCTION FOR AN ITEM

FIELD OF THE INVENTION

The present invention relates to the field of determining a demand function for an item and/or a product.

BACKGROUND ART

A seller or marketing research provider is frequently faced with the challenge of designing an appropriate pricing strategy for a new product or an existing product undergoing change in market conditions. Such a pricing strategy usually requires reliable information on cost and demand. Reliable information on cost is usually readily attainable. Reliable information on the demand function, on the other hand, may not be so readily available. The seller or market researcher may be able to use historical price and volume information, when available, to obtain an estimate of the demand function. However, with new products or existing products undergoing significant changes in the market structure, historical price and volume information is rarely available.

In order to design a pricing strategy for a new product or an existing product undergoing significant change, the seller or marketing research provider might decide to employ a survey or a field test-marketing technique. However, surveys are of limited value in that it is difficult to control the pool of participants, and the participants bear no consequences for their responses. Field test-marketing techniques are very costly to employ and, similarly, are of limited value because of limited experimental control.

Another option that can be used to determine a viable pricing strategy is an econometric analysis of historical market data. In some cases historical market data may exist in the form of bid data from standard auctions. However, econometric analysis of historical market data is also of limited value because there is likely to be limited applicable data and because strong modeling assumptions are needed to identify the underlying demand function under the current market conditions.

One conventional method for estimating the demand function utilizes an analysis of bid data acquired from standard auctions. Attempts to estimate the demand function from bid data acquired from standard auctions have two main disadvantages. First, standard auctions are not necessarily designed and conducted with demand estimation in mind. Therefore, the data from such auctions are rarely ideal for demand estimation. Thus, additional data gathering effort is needed to obtain the information on covariates that are crucial for reliable structural estimation. Also, it is often necessary to make unpalatable behavioral assumptions regarding any inference based on bids from standard auctions. For example, the risk concerns which factor into the bidders' decisions for most standard auctions make it difficult to discern the price that they are truly willing to pay.

Thus, there exists a need for an apparatus and a method for extracting the underlying demand function for new products and for existing products that are subject to new market conditions.

DISCLOSURE OF THE INVENTION

An embodiment in accordance with the present invention provides a method for determining a demand function for an item. For example, the method includes determining a first estimate of the demand function for the item by utilizing a first auction having a first set of auction parameters. Additionally, the method includes determining a second estimate of the demand function for the item by utilizing a second auction using auction data from the first auction. The second auction has a second set of auction parameters based on the first estimate of the demand function.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION OF THE INVENTION

Figure 1:
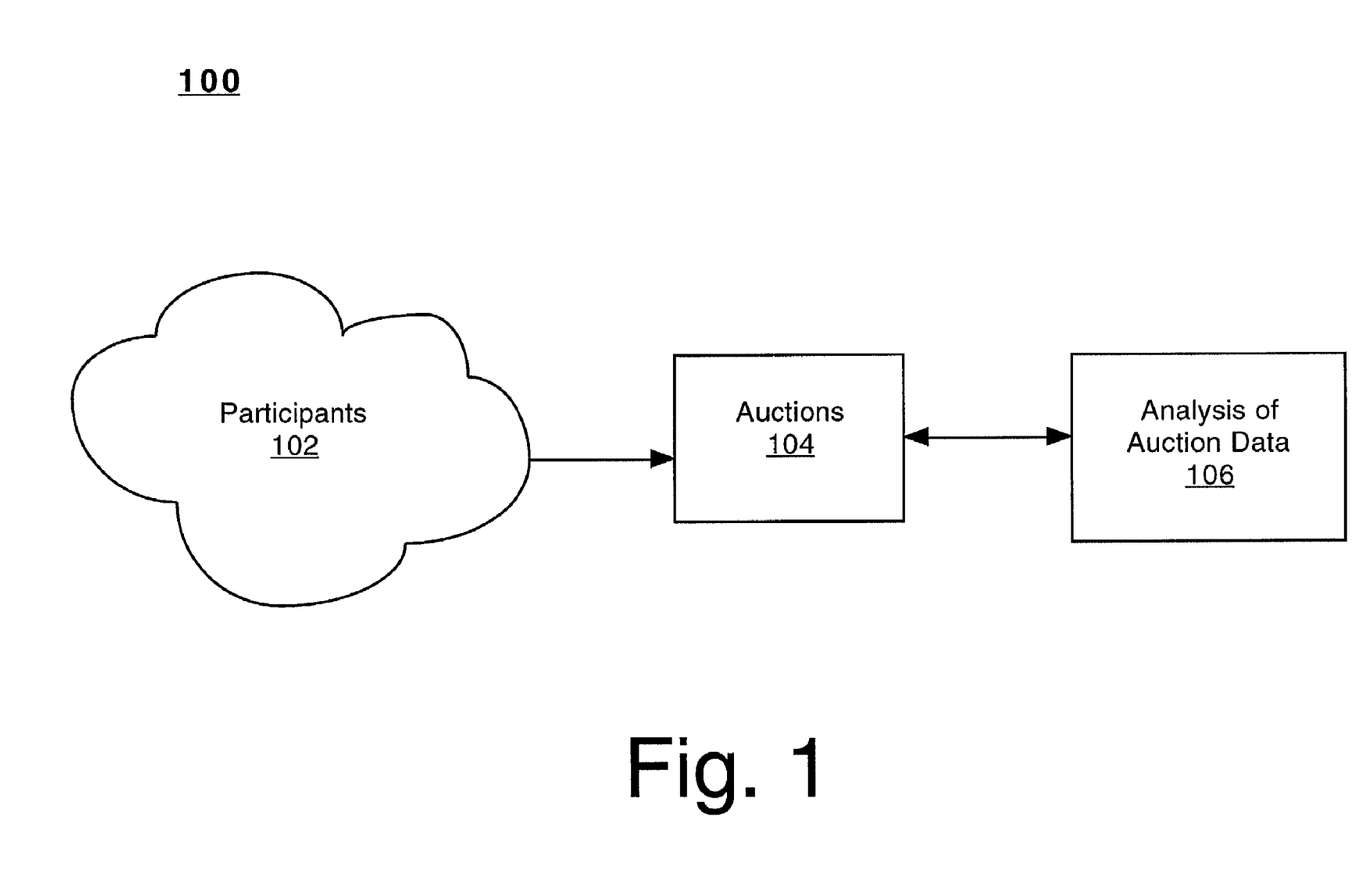
FIG. 1 is a block diagram overview of an exemplary system for determining a demand estimation for an item in accordance with an embodiment of the present invention.

FIG. 1 is a block diagram overview of an exemplary system 100 for determining a demand estimation for an item in accordance with an embodiment of the present invention. It is noted that embodiments of the present invention provide a method and system thereof for test marketing and determining demand function for new products and existing products under new market conditions. This is achieved by running auctions (e.g., 104) that are designed for the specific purpose of efficient demand estimation. For example, a method of the present embodiment allows a seller to estimate the demand function for a set of products or items by using bids from a series of controlled auctions among a representative sample of buyers (e.g., 102). This may be achieved by controlling participant selection and the specific auction rules as well as quantities offered in each auction and the timing and duration of such auctions in order to obtain efficient demand estimation. Additionally, this method avoids strong a priori assumptions about the unknown demand function and about bidding behavior in auctions and uses auctions as part of the data collection process designed specifically for efficient demand estimation.

System 100 includes participants 102 which are utilized for conducting auctions 104. The data of auctions 104 may be analyzed by module 106. In one embodiment, a computer system may be used for analyzing the auction data of module 106. It is appreciated that the computer system may be any kind of computer system. For example, the computer system may be, but is not limited to, a main-frame computer system, a super computer system, a workstation computer system, a server computer system or a personal computer system.

It should be understood that the conducted auctions 104 of the present embodiment may be Vickrey-type auctions. The bidding decisions in Vickrey auctions are such that every participant reveals his/her true willingness to pay (WTP) as a dominant strategy regardless of how the rival bidders behave. Bidding behavior in alternative auction formats typically depends on the bidder's private information about the specific auction environment. Thus, it is generally more challenging to infer the underlying valuations of an item from the observed bids. A sealed-bid second price auction (SPA) is commonly referred to as the simplest form of a Vickrey auction for a situation where a single item is available for sale. In a sealed-bid second price auction, the highest bidder wins the item and pays the second highest bid. If the selected participants form a representative sample of the set of potential buyers of an item, then their bids can be used to get an accurate picture of the potential demand function for that item. This may be achieved by mapping the observed bids (true valuations) with the observable characteristics of the buyers.

During auctions 104 of FIG. 1, if the demand for the new product or item is such that each customer wants no more than a single unit, then a standard sealed-bid second price auction or a multi-unit version (price equals highest rejected bid) may be used to extract the participants' willingness to pay. In the case where the buyers may demand different quantities, the procedure may be modified to preserve truth-telling as the optimal bidder strategy. In this case, a buyer who wishes to buy more than one unit would have incentives to misrepresent his/her demand if all available units are sold at a uniform price equal to the highest rejected bid. In order to preserve truth-telling as the optimal bidder strategy in this setting with multiple-unit demands, a bidder's payment is set equal to the price that would clear the market if this bidder's demand is removed from the market.

The invited bidders (e.g., 102) may be selected from a pool of subjects who have previously agreed to participate in test-marketing programs. During auction 104, a fixed number of units may be sold through a sealed-bid Vickrey auction among a fixed number of invited participants. Depending on the item under consideration, each bidder may be restricted to bid for a single unit. Information about the item for sale, auction rules, the number of units for sale, the number of invited bidders, reserve price, acceptable bid levels, starting and ending time of the auction may be announced to the invited bidders both in an e-mail invitation and on the auction site.

Figure 2:
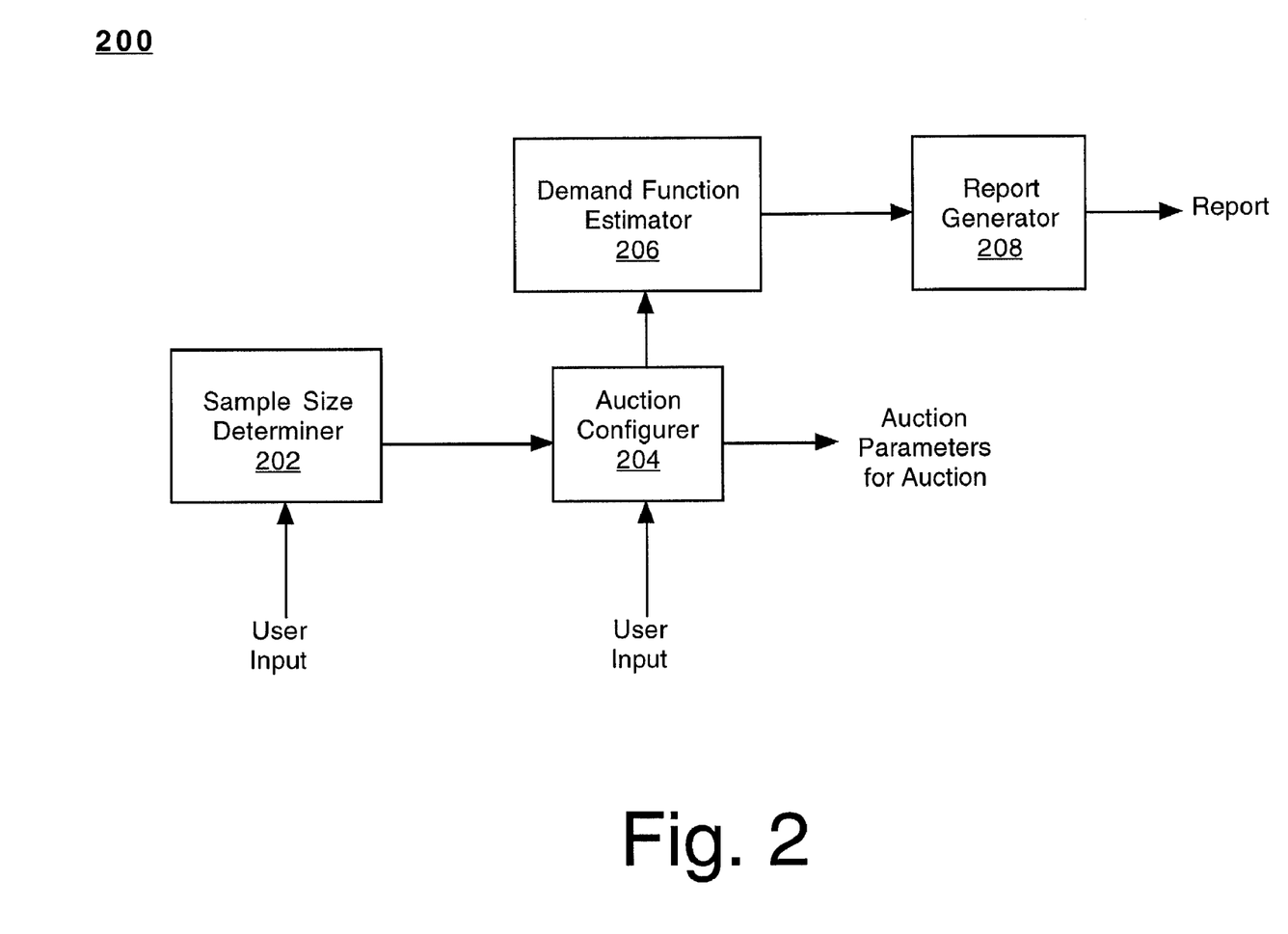
FIG. 2 schematically illustrates an exemplary automated demand estimator system for determining a demand estimation for an item in accordance with an embodiment of the present invention.

FIG. 2 shows an exemplary automated demand estimator system 200 for determining a demand function for an item in accordance with an embodiment of the present invention. In one embodiment, the automated demand estimator system 200 is a software system implemented in a computer system. Alternatively, the automated demand estimator system 200 may be implemented by hardware or firmware. In another embodiment, the automated demand estimator system 200 may be a software system that resides in any type of computer readable medium having code embodied therein for causing a computer system to perform particular operations and/or functionality for determining a demand estimation for an item.

The computer system that embodies the automated demand estimator system 200 may be any kind of computer system. For example, the computer system may be, but is not limited to, a main-frame computer system, a super computer system, a workstation computer system, a server computer system or a personal computer system.

The automated demand estimator system 200 of FIG. 2 may be utilized for determining a demand estimation for an item or product. Specifically, system 200 is able to provide test marketing and determining demand function for new products or items and existing products or items under new market conditions by running auctions (e.g., 104) that are designed for the specific purpose of efficient demand estimation. For example, demand estimator system 200 allows a seller to estimate the demand function for a set of items or products by using bids from a series of controlled auctions among a representative sample of buyers (e.g., 102). The automated demand estimator system 200 may achieve this by controlling participant selection and the specific auction rules as well as quantities offered in each auction and the timing and duration of such auctions in order to obtain efficient demand estimation. Furthermore, the demand estimator system 200 uses auctions as part of the data collection process designed specifically for efficient demand estimation. It should be understood that the automated demand estimator system 200 may be utilized to perform any of the functionality described herein with reference to FIGS. 4, 5 and 6.

The automated demand estimator system 200 includes, but is not limited to, a sample size determiner 202, an auction configurer 204, a demand function estimator 206, and a report generator 208. Specifically, the sample size determiner 202 determines a minimum sample size for one or more auctions for estimating demand of a given item for a user-specified accuracy. The sample size determiner 202 is coupled to receive user input such as the user-specified accuracy. It is noted that the sample size determiner 202 may determine a sample size for one or more auctions in accordance with any manner described herein.

The auction configurer 204 of FIG. 2 configures auction parameters in order to minimize cost of collecting a given sample size for estimating the demand function. It should be appreciated that the auction parameters that may be configured by the auction configurer 204 may include, but are not limited to, the number of auctions to be conducted, the products or items available in each auction to be conducted, the timing and duration of each auction to be conducted, the set of participants in each auction to be conducted, the number of items to sell in each auction to be conducted, the auction format to be used in each auction to be conducted and the reserve prices and any other parameters of the auctions to be conducted.

The auction configurer 204 is coupled to output the configured auction parameters to the demand function estimator 206 and to any type of auction module (not shown) capable of conducting an auction for the item. Furthermore, the auction configurer 204 is coupled to receive user input regarding auction parameters. Additionally, the auction configurer 204 is coupled to receive a determined sample size for an auction from the sample size determiner 202. It is understood that the auction configurer 204 may configure auction parameters for estimating a demand function in accordance with any manner described herein.

The demand function estimator 206 generates a demand estimation for the item utilizing bid data of one or more auctions having auction parameters determined by the auction configurer 204. For example, the demand function estimator 206 may determine a plurality of estimates of the demand function for the item utilizing a plurality of auctions. Each of the auctions after the first one have auction parameters based on the most recent determined estimate of the demand function. It is appreciated that the demand function estimator 206 may generate or determine a demand function for an item in accordance with any manner described herein.

The report generator 208 of FIG. 2 generates a report that includes the demand function estimation for the item. It is appreciated that the report generator 208 is coupled to receive the demand function estimation from the demand function estimator 206. The report generator 208 may generate a report in accordance with any manner described herein.

Figure 3:
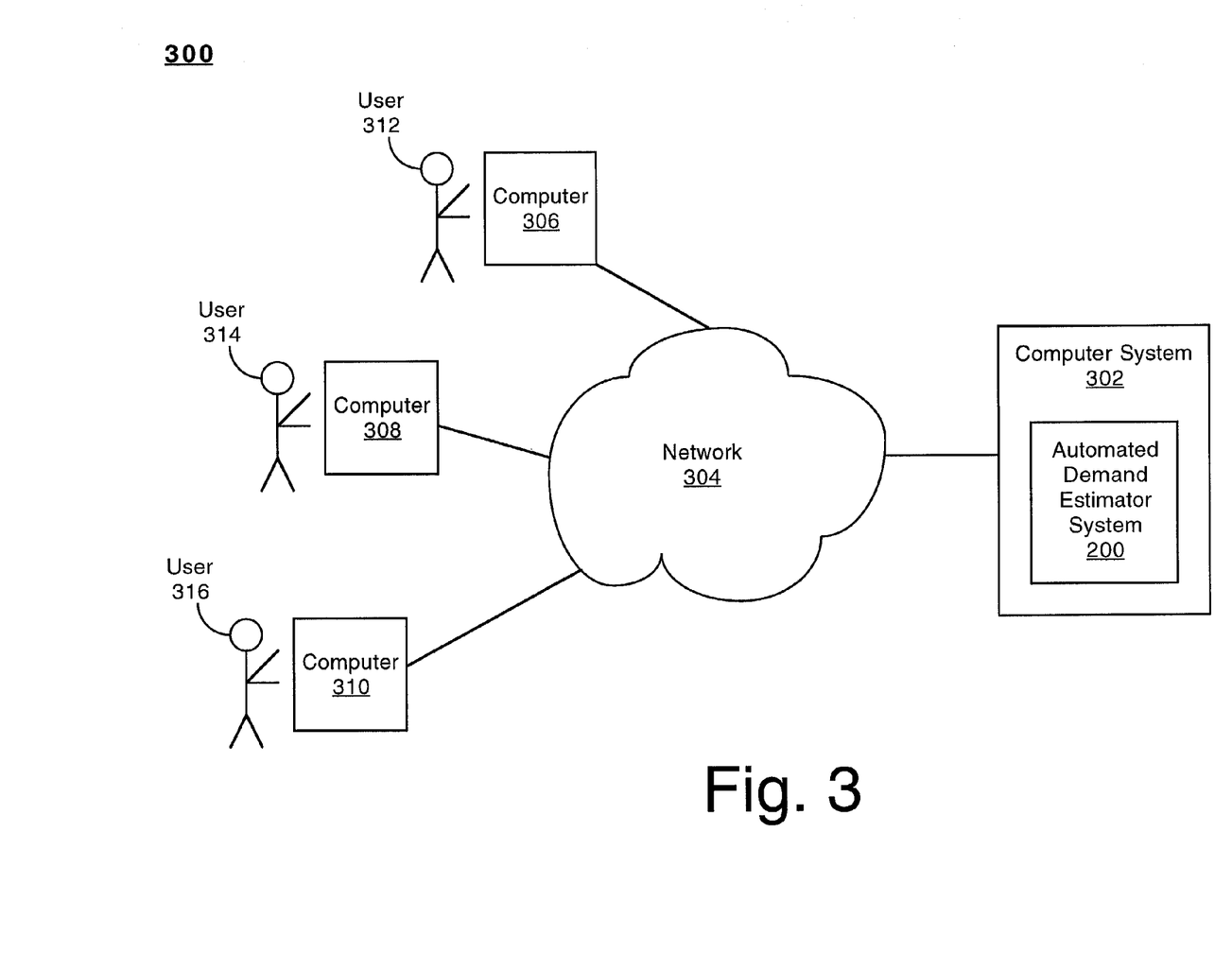
FIG. 3 is a block diagram of an exemplary network that may be utilized in accordance with an embodiment of the present invention.

FIG. 3 is a block diagram of an exemplary network 300 that may be utilized in accordance with an embodiment of the present invention. For example, network 300 may be utilized for test marketing and determining demand function for new products and existing products under new market conditions by running auctions (e.g., 104) that are designed for the specific purpose of efficient demand estimation as described herein.

Network 300 includes a computer system 302 that includes the automated demand estimator system 200. It is understood that computer system 302 may be any kind of computer system. For example, the computer system 302 may be, but is not limited to, a main-frame computer system, a super computer system, a workstation computer system, a server computer system or a personal computer system. Computer system 302 along with computer systems 306-310 are coupled to a network 304. As such, computer systems 302, 306, 308 and 310 are able to communicate via network 304. It is understood that network 304 may be any type of network such as a local area network (LAN), a wide area network (WAN), the Internet, a metropolitan area network (MAN), a wireless local area network (WLAN), a wired and/or wireless telecommunication network, among others. Furthermore, computer systems 302, 306, 308 and 310 may be coupled via wired and/or wireless communication technology.

Network 300 of FIG. 3 also includes computer users 312, 314 and 316 that use computers 306, 308 and 310, respectively. It is appreciated that computer users 312-316 may be participants (e.g., 102) in any auctions (e.g., 104) utilized by the automated demand estimator system 200 to determine an estimate of the demand function for an item.

Figure 4:
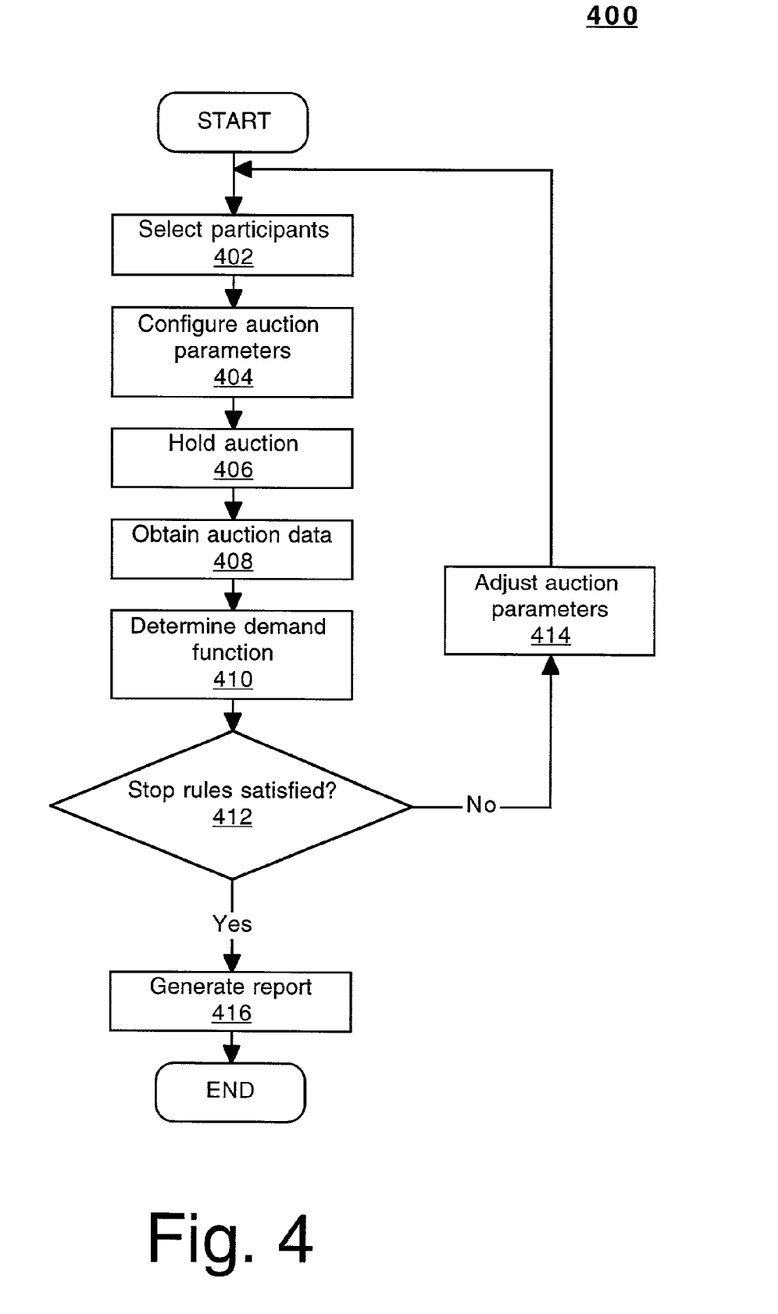
FIG. 4 is a flow chart diagram illustrating a method for determining a demand function for an item in accordance with an embodiment of the present invention.

FIG. 4 is a flow chart diagram illustrating a process 400 for determining a demand function for a product in accordance with an embodiment of the present invention. Although specific steps are disclosed in process 400, such steps are exemplary. That is, the present embodiment is well suited to performing various other steps or variations of the steps recited in FIG. 4. It should be appreciated that the steps of process 400 may be performed by software, by hardware, by firmware, or by any combination of software, hardware and firmware.

At step 402, participants are selected for an auction. Auction participants are selected that are representative of potential buyers. The larger the pool of participants, the greater the number of data points that will be available for process 400. As such, a greater number of data points will produce more accurate demand function results. However, there is a cost tradeoff in the participation selection process, as there are typically costs associated with each participant invited, so a large number of auction participants will result in increased cost.

The total number of actual participants will vary depending on the auction parameters such as number of invited participants in each auction, number of auctions to run, number of items to offer per auction. The goal is to find optimal values for these parameters so that the number of participants is maximized under user-specified constraints such as budget, time, total quantity, and other system constraints such as the maximum number of auctions per period, and the maximum number of bidders per auction.

In one embodiment, the optimum number of participants selected to participate in the auction is not known at the time of the first Vickrey auction, so an initial estimate of the number of participants is used. The initial estimate of the number of participants becomes refined through the iterative process of holding additional Vickrey auctions and gathering additional data.

At step 404 of FIG. 4, auction parameters are configured. In the present embodiment, auction parameters are configured to maximize the reliability and "accuracy" of the estimated conditional demand functions, subject to budgetary constraints given by the user. Auction parameters can include, but are not limited to, the number of auctions to be conducted, the products available in each auction to be conducted, the timing and duration of each auction to be conducted, the set of participants in each auction to be conducted, the number of items to sell in each auction to be conducted, the auction format to be used in each auction to be conducted and the reserve prices and any other parameters of the auctions to be conducted.

Auctions can be "self-financing" in that the profit generated from selling the items can be used to run more auctions at a later time. It might be beneficial to offer more than one item per auction so as to extract additional revenue. However, offering more items in an auction will lead to a lower selling price. Therefore, it is desirable to determine the number of items to sell at each auction that provides the maximum profit. In the present embodiment, the auction parameters begin as an estimate and are reconfigured for subsequent auctions based on results and parameters from previous auctions. The number of items to sell that provides the maximum profit is one parameter that is determined through such an iterative process.

In step 406 of FIG. 4, an auction is held. The auction format of the present embodiment is a Vickrey auction. The bidding decisions in Vickrey auctions are such that every participant reveals their true willingness to pay as a dominant strategy, regardless of how rival bidders behave.

A sealed-bid-second-price auction is the simplest form of a Vickrey auction for a situation where a single item is available for sale. In a sealed-bid-second-price auction the highest bidder wins the item and pays the second highest bid price. In the present embodiment, selected participants form a representative sample of the set of potential buyers. Therefore, their bids reflect an accurate picture of the potential demand function for the product.

In a case where the demand for a product is such that the buyers demand different quantities, a multi-unit version of the Vickrey auction, which is a "price equals highest rejected bid" version, may be used. In the multi-unit Vickrey auction, the method of inducing "truth telling" may be to ensure that the price paid by the bidder be equal to the price that would clear the market if this bidder's demand were to be removed from the market. This eliminates the situation in which buyers wishing to buy more than one unit might be tempted to misrepresent their demand if all available units were to be sold at a uniform price equal to the highest rejected bid.

As shown by step 408, the bid data from the auction is obtained. In one embodiment, the auction bid data may include the number of participants, the number of items for sale, K, and the values bid, $v_1$, $v_2$, etc. Bid data from a given auction is analyzed and the results are used as input for determining auction parameters for future auctions.

In step 410 of process 400 the demand function is determined from the auction data obtained in step 404 using standard statistical techniques. The demand function according to one embodiment of the present invention is obtained from the probability distribution function $F(v)$ of the observed values bid.

According to one embodiment of the present invention, as shown in step 412 of FIG. 4, there is a set of "stop rules" that are tested to determine if the last auction has been run or if additional auctions may need to be run. The "stop rules" may be based on the demand function having met one or more of the following: an improvement criterion, budgetary considerations, a fixed number of auctions, etc. If the "stop rules" have not been satisfied at step 412, then auction parameters (e.g., the number of invitees and number of items to sell) are adjusted based on data from the most recent auction at step 414, and another auction is held using the new auction parameters.

When the "stop rules" are satisfied at step 412, the final values of the joint distribution of bids from the most recent auction become the output and are generated in a final report at step 416. The report may be in any or a combination of graphical, tabular or prose format. The output gives the final estimate of the demand function.

Figure 5:
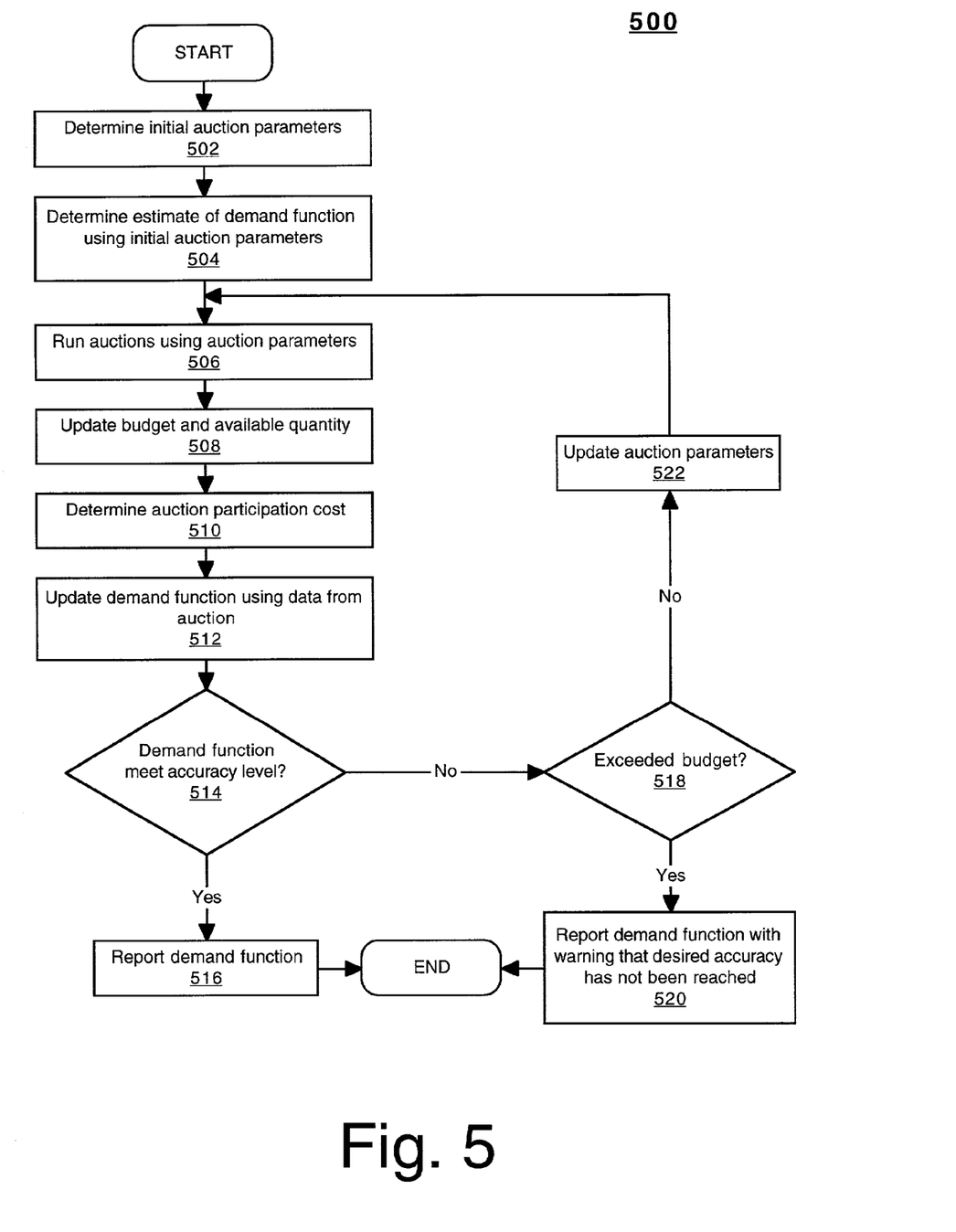
FIG. 5 is a flow chart diagram illustrating a process for determining a demand function for an item by running auctions until either the demand function meets predetermined accuracy criteria or budget resources have been utilized, according to an embodiment of the present invention.

FIG. 5 is a flow chart diagram illustrating a process 500 for determining a demand function by running auctions until either the demand function meets predetermined accuracy criteria or budget resources have been utilized, according to an embodiment of the present invention. Although specific steps are disclosed in process 500, such steps are exemplary. That is, the present embodiment is well suited to performing various other steps or variations of the steps recited in FIG. 5. It should be appreciated that the steps of process 500 may be performed by software, by hardware, by firmware, or by any combination of software, hardware and firmware.

At step 502, the initial auction parameters are determined for running a first auction (e.g., Vickrey auction). In the present embodiment, the auction parameters take as input a target market and a pool of participants selected based on conventional statistical sampling principles to ensure a representative sample of the potential buyers in the target market. The minimum sample size for estimating demand with a given accuracy is then determined and auction rules are configured to minimize the net cost of collecting a given sample size for demand estimation.

Auction parameters may include the following: the auction format to be used; the number of auctions to be conducted; the reserve prices in the auctions to be conducted; the number of units available in each auction to be conducted; the set of participants in each auction to be conducted; the timing and duration of each action to be conducted; and the set of products available in each auction to be conducted.

In the present embodiment, the user first specifies the item for which the demand is to be estimated as well as the target market in the form of observable buyer characteristics. The user also provides operational information on terms and conditions, such as payment terms, delivery options, etc. that are common to all of the auctions that are to be conducted.

In addition, the user specifies the starting date (Start_Date) for the test-marketing program and the user specifies the total duration of the test-marketing program (Time (0)) (e.g., a month, three weeks, two months). The user also specifies the time frame (Time_Frame) of demand to be estimated (e.g., whether the relevant demand is quantity demanded per day, per week, per month, etc.).

In the present embodiment, the user specifies the time frame of demand to be estimated (Time_Frame); e.g., he/she states if the relevant demand is quantity demanded per day, per week, per month, etc. The user also specifies the total duration of the test-marketing program (Time), e.g., a month, three weeks, two months, etc. In the present embodiment the number of time periods (T) is determined by the equation T=Time/Time_Frame. In the present embodiment, the number of time periods is at least two time periods. In each period a number of auctions are conducted simultaneously. The reason for having two or more time periods is threefold. The first reason is to exploit potential savings from sequential sampling. More particularly, sample information from early periods may provide sufficient accuracy for the estimation of the unknowns so that it may not be worth the further costs of getting additional information. Second, the design decisions (e.g., size of the sample, number of auctions and auction parameters) are based on current information. Initial information about the unknowns is coarser than the information in later periods. Thus, a sequential approach makes it possible to refine and improve the design decisions during the course of the data collection process. Finally, there may be random temporal variation in the unknown elements. In this case, sequential sampling allows one to control for such time effects.

In the following discussion, time periods are indexed by the variable t. In this embodiment, for periods t=1 to T, the following notation is used to describe the present invention:

Revenue$_t$=Revenue collected in period t from auction sales.

Cost$_t$=Total cost incurred in period t for conducting auctions and inviting bidders as well as supplying the number of units sold in the auctions.

Budget$_t$=Budget amount available at period t=Budget$_{t-1}$+Revenue$_{t-1}$−Cost$_{t-1}$.

x$_t$=total quantity sold in all auctions at period t.

Q$_t$=total quantity available at period t=Q$_{t-1}$−x$_{t-1}$.

q$_t$=total number of units auctioned at period t.

S$_t$=target total sample size calculated on the basis of information available up to, and including, period t−1.

s$_t$=the size of the sample collected at period t.

ê$_t$=Estimate of auction participation cost, e, based on information available up to, and including, period t−1.

$\hat{F}_t(.)$=Estimate of the distribution of valuations, F (.), based on information available up to, and including, period t−1.

$a_t = \hat{F}_{t-1}(p_L)$, value of the empirical distribution function based on observations up to period t−1, evaluated at $p_L$, lower end of the relevant price range.

$b_t = \hat{F}_{t-1}(p_H)$, value of the empirical distribution function based on observations up to period t−1, evaluated at $p_H$, upper end of the relevant price range.

In the present embodiment, the user provides an initial program budget (Budget (0)) for test-marketing and demand estimation purposes and the user specifies the total number of units available for test-marketing and demand estimation purposes (Quantity (0)).

The user also specifies the cost that has to be incurred to set up an auction (Cost_per_Auction). This includes the listing and other transaction fees charged by an auction service provider if a third party service provider conducts the auctions.

Moreover, the user specifies the cost incurred to recruit or maintain a subject (Cost_per_Bidder) and the cost of making a unit of the item available for sale (Cost_per_Unit). In addition, the user specifies the range of relevant prices under consideration (Price_Range) such as, for example, an interval $[p_L, p_H]$.

If the user has an initial estimate of the demand function based on previous marketing studies on the same or similar products, it can optionally be specified (Initial_Estimate). If available this estimate is used to configure the initial stage decisions on the number of auctions, the number of bidders and the number of units in each auction.

In the present embodiment, the following constraints are used for the following decision variables (the number of auctions, the number of bidders per auction, the number of units per auction, reserve price in each auction) should satisfy the following user-specified bounds:

a. 0 <A←MaxA=maximum number of auctions per period
b. 0 <n←MaxB=maximum number of bidders per auction
c. 0 <k←MaxU=maximum number of units per auction
d. MinR←r←MaxR, bounds on the reserve price.

With regard to pricing of items to be sold at auction, in the present embodiment, various price levels are a priori ruled out as irrelevant to potential decisions. For example, if the demand estimates are to be used in a pricing decision and the unit production cost is expected to stay at its current level, then demand at prices below the current unit production cost is obviously irrelevant. In this case, the user may specify the price range as an interval with a lower bound that is no smaller than the current unit cost. In other situations, the relevant price range may include price levels below the current unit production cost. An example of this may be a situation where the unit production cost at the test-marketing phase may be higher than the unit production cost that would be available in the actual marketing phase. For instance, the objective of demand estimation may be to determine whether or not it is worthwhile to invest in a technology that reduces unit production costs from its current level.

The user also specifies a target accuracy (Target_Accuracy) for the demand estimate in terms of two parameters, a precision level, $\delta$, and a significance level, $\alpha$. These parameters represent the condition that the relative discrepancy between the estimated and actual demand functions is less than $\delta$ with probability at least $1-\alpha$. Alternatively, the user may state a target accuracy for the estimated demand in terms of the size of the sample. It is understood that the target accuracy may be measured by a precision parameter, $\delta$, and a significance level $\alpha$.

In the present embodiment, the initial demand function, is represented by the unknown distribution function $F(x)$ of a random variable X, is represented by the function $\hat{F}_s(x)$ that is an empirical distribution function based on a sample of s observations.

In this embodiment, the precision parameter, $\delta$, can be specified in two alternative ways. In the first case, the precision parameter, $\delta$, represents the upper bound on relative deviation of $\hat{F}_s(x)$ from $F(x)$. In this case, the precision parameter, $\delta$, is interpreted as the condition that the maximum relative deviation, $[\hat{F}_s(x) - F(x)]/\hat{F}_s(x)$, is no greater than $\delta$, where the maximum is taken over the values of x for which $a < \hat{F}_s(x) < b$. In the second formulation, the desired condition is that the maximum absolute deviation, $[\hat{F}_s(x) - F(x)]$, is no greater than $\delta$, where the maximum is taken over the values of x for which $a < \hat{F}_s(x) < b$.

For a sample size s and a subinterval [a, b] in the unit interval, if the precision criterion is given in terms of relative deviation, $Pr(s, \delta, a, b)$ represents the probability that the empirical distribution $\hat{F}_s(x)$ based on a sample of s observations deviates from $F(x)$ by less than $\delta \hat{F}_s(x)$ is denoted by $Pr(s, \delta, a, b)$:

$$Pr(s, \delta, a, b) = \text{Prob}\{[\hat{F}_s(x) - F(x)]/\hat{F}_s(x) \leftarrow \delta \text{ for all x such that } 0 < a \leftarrow \hat{F}_s(x) \leftarrow b\}.$$

If the precision criterion is given in terms of absolute deviations, $Pr(s, \delta, a, b)$ represents the probability that the empirical distribution $\hat{F}_s(x)$ deviates from $F(x)$ by less than $\delta$ when the sample size is s, precision is $\delta$ and [a, b] is a subinterval of the in the unit interval:

$$Pr(s, \delta, a, b) = \text{Prob}\{[\hat{F}_s(x) - F(x)] \leftarrow \delta \text{ for all x such that } 0 < a \leftarrow \hat{F}_s(x) \leftarrow b\}.$$

In both of the above formulations, the numbers a and b are related to the user specified range of relevant price levels, $[p_L, p_H]$, by the relation: $\hat{F}_s(p_L) = a$ and $\hat{F}_s(p_H) = b$. The user-specified significance level a represents the condition that $Pr(s, \delta, a, b) > 1 - \alpha$.

The user-specified accuracy criterion $(\delta, \alpha)$ can be converted to a sample size $s(\delta, \alpha, a, b)$ where $s(\delta, \alpha, a, b)$ is the minimum sample size that satisfies the relationship $Pr(s(\delta, \alpha, a, b), \delta, \alpha, b) = 1 - \alpha$. For this specification of the accuracy criterion, the task is to minimize the total cost of collecting a sample of size $s(\delta, \alpha, a, b)$ by selecting the auction parameters.

In an alternative embodiment, when a significance level $\alpha$, and a subinterval [a, b] in the unit interval are given, the sample size s is selected to minimize $\delta(s, \alpha, a, b)$ subject to a budget constraint, where $\delta(s, \alpha, a, b)$ is the best precision that can be achieved with a sample of size s with probability $1-\alpha$, e.g., the solution to the equation $Pr(s, \delta, a, b) = 1-\alpha$.

In an alternate embodiment $Pr(s, \delta, \alpha, b)$ is maximized by selecting s subject to a user-specified budget constraint.

In step 504, a demand function is determined based on the initial auction parameters for the first Vickrey auction. More particularly, in the present embodiment, the initial auction parameters of step 502 are used to determine an initial estimate of the demand function.

In the present embodiment, the initial estimate of the demand function $F_0$ is obtained using the user-specified inputs, Budget (0) and Quantity (0), to set Budget$_0$=Budget (0), $Q_0$=Quantity (0). The revenue (Revenue$_0$) and the cost (Cost$_0$) are both set to zero. If the user specifies initial estimates for the unknowns e (e.g., $e_0$) and $F(.)$ (e.g., $F_0(.)$), these values are also used in the initialization: (e.g., $\hat{e}_0 = e_0$, and $\hat{F}_0(.) = F_0(.)$). Otherwise, the default value for $\hat{e}_0$ is set arbitrarily at $\hat{e}_0 = p_L/10$ and the default value for $\hat{F}_0(.)$ is set, also arbitrarily, as a uniform distribution on the interval $[0.10 p_L, 2 p_H]$.

In step 506, a first auction (e.g., Vickrey auction) is run using the initial auction parameters from step 502. In a single Vickrey auction, bidding behavior conditional on participation in the auction is independent of all the unknown elements of the auction environment. Thus, for example, a bidder with valuation v submits v as his bid. This bidding strategy ceases to be optimal if the bidders are allowed to participate in more than one auction. For example, if a bidder who does not win an item can participate in a subsequent auction, then his bidding strategy depends on all the parameters of the two auctions as well as the anticipated behavior of rival bidders. In such cases, the task of inverting the submitted bids to obtain the underlying valuations usually calls for strong behavioral assumptions. In order to avoid such assumptions and to keep truth-telling as the dominant bidding strategy, the present embodiment does not allow a subject to participate in more than one auction.

Thus, an auction with n invited bidders provides a sample of size n from the unknown distribution $F(.)$ provided all invited bidders choose to submit a bid. If the auction induces only some of the bidders to submit bids, then the observed bids reveal only partial information about the distribution function to be estimated. A plausible assumption is that, due to costs involved in evaluating the auctioned item and submitting a bid, only those bidders with valuations greater than some particular level choose to participate in the auction. If this is the case, then the observed bids form a sample from the distribution $F(.)$ truncated on the left. The truncation point is expected to depend on the auction parameters such as the number of bidders, the number of units sold, the reserve price, etc.

Each bidder has an auction participation cost, e, which he/she has to incur to evaluate the item, and to prepare and submit a bid. A bidder with valuation v and participation cost e participates in an auction if the expected payoff from participation exceeds the cost of participation. Such a bidder's expected payoff from the auction depends on the number of units for sale and the number of potential rivals. For demand estimation purposes, a bidder participates in an auction with n invited bidders and k units for sale if and only if his valuation of the item exceeds a critical valuation level, denoted as $v_c$. This critical valuation depends on the anticipated participation and bidding behavior of rival bidders as well as the number of units offered in the auction. From the seller's and an outside analyst's point of view, the participation cost e and the distribution of valuations F(.) are unknown. Thus the critical valuation, $v_c$, of a typical participant is also unknown.

To determine $v_c$, it is first assumed that each rival bidder follows this participation rule, e.g., he/she submits a bid in the auction if and only if his/her valuation exceeds $v_c$. Then, a bidder with valuation v less than $v_c$ expects to win an item in the auction if and only if fewer than k out of n−1 rival bidders participate in the auction, and the price he/she pays when he/she wins is the reserve price r. The condition is used that a bidder with valuation less than $v_c$ chooses to stay out of the auction to determine the critical valuation $v_c$.

The critical valuation $v_c$ is the minimum v such that (v−r) Prob {fewer than k out of n−1 rival bidders have valuations that exceed v} ≧ e. The second term in this expression is a function of n, k and the unknown function F(.). Applying standard probability theory, this term is obtained as Prob {fewer than $k$ out $n-1$ rival bidders have valuations that exceed $v$} =

$$\sum_{j=0}^{k-1} \binom{n-1}{j} F(v)^{n-j-1}(1-F(v))^j.$$

Thus, the critical valuation $v_c$ which solves the above equation depends on (n, k, r, F (.), e).

At step 508, the currently available quantity and budget are updated to reflect the cost of the auction and the number of units auctioned off.

In step 510, the cost of the demand estimation process is determined. More particularly, in one embodiment, a threshold value for participation is determined and participation cost is determined ( a period t estimate is obtained for e, $\hat{e}_t$).

A simple estimate of $v_c$ (n, k, r) is obtained from the lowest and second lowest observed bids in the sample of bids from all auctions with n bidders, k units and reserve price r. When TM (n, k, r) denotes the number of bids submitted in all auctions with n bidders, k units and reserve price r. Let $B_{(1):TM}$ and $B_{(2):TM}$ denote the lowest and second lowest bids in the sample, an estimate of $v_c$(n, k, r) is given by the equation $\hat{v}_c = \{(2\,TM-1)B_{(1):TM} - (TM-1)B_{(2):TM}\}/TM$ If an estimate of the participation cost e, say $\hat{e}$, and an estimate of F (v), say $\hat{F}(v)$, are available, then one can obtain an alternative estimate of $v_c$ all values of the parameters (n, k, r) by solving the following equation numerically for the unknown $$v_c: \hat{e} = (v_c - r) \sum_{j=0}^{k-1} \binom{n-1}{j} \hat{F}(v_c)^{n-j-1}(1 - \hat{F}(v_c))^j$$

for parameter configurations (n, k, r) that do not appear in the sample with sufficient frequency this alternative approach is going to be adopted to estimate $v_c$ (n, k, r).

In the present embodiment participation cost is estimated as follows. An upper bound for the auction participation cost, e, can be estimated by using estimates of the unknowns, $v_c$ and F(.), in the expression that characterizes bidder participation decision. Index all the auctions in the current sample by i. Let $(n_i, k_i, r_i)$ denote the number of bidders, the number of units and the reserve price in auction i, and let $v_{ci}$ denote the estimated threshold valuation for participation for auction i. Define $$E_i = (\hat{v}_{ci} - r_i) \sum_{j=0}^{k_i-1} \binom{n_i-1}{j} \hat{F}(\hat{v}_{ci})^{n_i-j-1}(1 - \hat{F}(\hat{v}_{ci}))^j$$

where the index i refers to the i'th auction in the sample. An estimate of an upper bound for e is obtained by taking the average of $E_i$ over all the auctions in the sample. If the current sample contains I auctions then $$\hat{e} = (1/I) \sum_{i=1}^{I} E_i$$

can be used as an estimate for an upper bound for the unknown e.

At 512, the demand function is updated using data from the auction conducted in step 506. In the present embodiment, the demand function can be determined on the basis of single unit demand or multiple unit demand.

A representative customer in the target market has observable characteristics denoted by a vector X. These characteristics include what is known or can be learned about the customer, e.g., demographic information, past purchases, income, etc. For the purpose of illustration, a method is presented for estimating the demand for a case where each potential buyer is interested in at most one unit of the product.

In the single unit demand case, a customer's maximum willingness to pay, i.e., his valuation, for the object to be sold, conditional on X, is denoted by V. That is, a customer with valuation V buys the item if and only if the price of the item, $P$, is less than V. The seller cannot observe V directly. From the seller's point of view V is a random variable. The distribution function of V is denoted by $F(v)$. The function F(v) is also unknown by the seller. The goal of the test-marketing effort is to gather data to estimate the unknown function F (v). Once an estimate of the function F(v) is determined, the demand function for the item is obtained as follows.

A representative customer's demand for the item under consideration depends on the price, p. If the customer's valuation, V, is less than the price, p, the customer does not buy the item, otherwise he/she buys it. Thus, the quantity bought by the customer in response to a price p is a random variable with the following distribution: $D(p)=0$ with probability $F(p)$, and $D(p)=1$ with probability $1-F(p)$.

When $Q(p)$ denotes the total quantity sold in the market at a price p, if the number of potential customers in the target market is N, then $Q(p)$ is a Binomial random variable with parameters N and $(1-F(p))$. Accordingly, $Q(p)$ is distributed Binomial $(N, 1-F(p))$.

Since the seller's revenue depends on $Q(p)$ and the cost may also depend on $Q(p)$, the seller's profit is also a random variable, the distribution of which is determined by the distribution of $Q(p)$. For the purposes of illustration, the unit cost of production is a constant and it is assumed that production is made-to-order. In this case, the seller's profit corresponding to a price p and unit cost c is $\pi=(p-c)Q(p)$ which is a random variable. If the distribution of $Q(p)$ is known then the distribution of profit can be obtained by well-known statistical methods. One takes a sample from this distribution of $Q(p)$ and forms a sample of $\pi$ values by evaluating the function $(p-c)Q(p)$ at the observed values of $Q(p)$. The goal of the test-marketing effort is to gather data to estimate the unknown function $F(.)$. Once an estimate of the function $F(.)$ is determined, the distributions of quantity sold and the associated profits are readily obtained.

The following are models of demand that are used to update the demand function where the buyers may wish to buy multiple units. Common characteristics of this class of models is that the randomness in demand is generated by some cumulative distribution function, $F(.)$, and thus the issue of demand estimation is reduced to estimation of a distribution function.

In the present multiple unit models for determining demand, a representative customer's demand per period for various quantities of the product corresponding to various price levels is determined by two factors: Z which represents the maximum quantity per period the customer can possibly buy; and $F(.)$, a cumulative distribution function that determines the customer's marginal valuation for various quantity levels.

The two elements $(Z, F(.))$ can be used in several alternative ways to model a situation where customers have random demand schedules. A customer is represented by a random sample, $(W_1, W_2, \ldots, W_Z)$, of size Z which is obtained from the cumulative distribution function $F(.)$. Various demand models can be generated by using $F(.)$ in different ways. Two such ways to generate two models of random demand with multiple units are presented. In both formulations, the maintained assumption is that demand schedule is downward sloping, e.g., marginal valuation declines with the number of units consumed.

In a first model for multiple unit demand, a customer's demand schedule is represented by the order statistics, $(W_{1:Z}, W_{2:Z}, \ldots, W_{Z:Z})$, a random sample, $(W_1, W_2, \ldots, W_Z)$, of size Z from the cumulative distribution function $F(.)$. In this formulation $W_{j:Z}$ represents the marginal valuation of the zth unit. By construction, $W_{1:Z} \geq W_{2:Z} \geq \ldots \geq W_{Z:Z}$.

In this model, a customer's willingness to pay for z units, $V(z)$, is the sum of the first z marginal valuations:

$$V(z) = \sum_{j=0}^{z} W_{j:Z}.$$

In the second model for multiple unit demand, a customer's demand schedule is a random vector, $(W_1, W_2, \ldots, W_Z)$, of size Z which is constructed using $F(.)$ as follows: $W_1$ is a random draw from $F(.)$. For $j=2, \ldots Z$, $W_j$ is a random draw from $F(.)$ truncated at $W_1$. In this model, a customer's willingness to pay for z units, $V(z)$, is the sum of the first z marginal valuations:

$$V(z) = \sum_{j=0}^{z} W_j.$$

Continuing with step 508 in one embodiment, the demand function is updated using data from the auction conducted in step 506. In the present embodiment, the demand function is updated by determining a period t estimate of $F(.)$, which is represented as $F_t(.)$.

For fixed n, k and r, the observed bids form a random sample from the distribution $F(v)$ truncated at $v_c(n, k, r)$. Given the sample of s valuations $v_1, v_2, \ldots v_s$ (obtained by pooling submitted bids from all the auctions), statistical techniques are then used to estimate $F(v)$.

In the present embodiment, $\hat{G}(v)$ is used to denote the empirical cumulative distribution of observed bids. Since observed bids are a random sample from the distribution $F(v)$ truncated at $v_c$, the following relation exists between $\hat{G}(v)$ and the unknown distribution $F(v)$: $\hat{G}(v)=(F(v)-F(v_c))/(1-F(v_c))$ for $v \geq v_c$.

Using $Q(p)$ to denote the total quantity sold in the market at a price p. If the number of potential customers in the target market is N, then $Q(p)$ is a Binomial random variable with parameters N and $(1-F(p))$. For $p \geq v_c$, there is an estimate $1-\hat{G}(p)(1-F(v_c))-F(v_c)$ for the unknown parameter, $(1-F(p))$, of the demand function. That is, for $p \geq v_c$, $Q(p)$ is distributed Binomial $(N, 1-\hat{G}(p)(1-F(v_c))-F(v_c))$.

Therefore, given an estimated demand function, the distribution of any function of $Q(p)$ can be estimated using any of a number of statistical methods. In particular, the distribution of profit can be estimated as follows: a sample is taken from the estimated distribution of $Q(p)$ and forms a sample of profit values by evaluating the function profit=$(p-c)Q(p)$ at the observed values of $Q(p)$. Additional auctions are subsequently held and will use refined values of the auction parameters based on the results from the most recently run auction.

At step 514, a determination is made as to whether the demand function meets a specified accuracy level. If the demand function does not meet the specified accuracy level at step 514, the process proceeds to step 518. However, if the demand function does not meet the specified accuracy level at step 514, the process proceeds to step 516. In step 516, the demand function is reported and the process ends. More particularly, in one embodiment of step 51δ, if $(Q_t=<0$ or $t>T)$ the current estimate of $F(.)$ is reported.

At step 518, a determination is made as to whether the available budget has been exceeded. It is understood that step 518 may be performed in a wide variety of ways in accordance with the present embodiment. For example, the available budget may be analyzed and the budget may be determined to have been met or exceeded if the available budget is less than zero (e.g., Budget$_t<0$). If the budget has not been exceeded at step 518, the process proceeds to step 522. However, if the budget has been exceeded at step 518, the process proceeds to step 520. In step 520, the demand function is reported with a warning that the desired accuracy has not been reached and the process ends.

When the demand function does not satisfy the specified accuracy level (step 514) and when the budget has not been exceeded (step 518), the auction parameters are updated at step 522. In the present embodiment, the auction parameters may be updated by finding optimal auction parameters based on the updated demand function determined in step 512.

In one embodiment, the auction parameters are updated by first computing the total number of units auctioned in period t. This is done by dividing the total available quantity at period t, $Q_t$, by the number of remaining periods, T–t: $q_t = Q_t/(T-t)$.

The target total sample, $S_t$, size and the size of the sample to be collected in period t, $s_t$, are then calculated to achieve the desired accuracy. Because the quantities Pr(s, δ, a, b) and s(δ, α, a, b), defined above, are independent of the underlying unknown distribution function F(.), they can be evaluated by a number of statistical methods. In one embodiment, exact and limit distributions are used to evaluate Pr(s, δ, a, b) and to compute and tabulate the desired quantity s(δ, α, a, b) for given input values (δ, α, a, b). An alternative approach is to use Monte Carlo simulation using an arbitrary distribution function (e.g., uniform distribution) and compute and tabulate the desired quantities Pr(s, δ, a, b) and s(δ, α, a, b) for given input values (δ, α, a, b).

The target sample size is then determined. More particularly, in the present embodiment the target sample size is determined for the period t. In the present embodiment, the user specified accuracy parameters (δ, α) and the price range [$p_L$, $p_L$] are used to determine an estimate of the target total sample size ($S_t$) to achieve the desired accuracy. In one embodiment the target total sample size is determined using the equation $S_t = s(δ, α, a_t, b_t)$.

In one embodiment, the function s(δ, α, $a_t$, $b_t$) is determined as follows. The auctions conducted generate observations on buyer valuations in the desired price range [$p_L$, $p_H$]. That is, the selected auction parameters do not induce bidders with valuations in the desired price range to stay out of the auction. Since a selected auction configuration (n, k, r) attracts bidders with valuations exceeding some threshold $v_c$, the auction parameters should be selected to make sure that $v_c < p_L$, the lowest price in the target price range. Otherwise, it would be impossible to generate bid observations to estimate the unknown F(.) for an interval of prices in the desired range. This is achieved by using the current estimates of F(.) and e in the bidder participation model and restrict the reserve price r to a range that induces a threshold valuation $v_c$ that is no greater than the lowest price in the target price range, $p_L$. If the current estimates of F(.) and e are $\hat{F}(v)$ and $\hat{e}$, respectively, and $p_L$ is the current lower bound for the price range, and if the reserve price is selected to satisfy $$r(n, k, p_L, \hat{e}, \hat{F}(\cdot)) = p_L - \left\{ \hat{e} / \sum_{j=0}^{k-1} \binom{n-1}{j} \hat{F}(p_L)^{n-1-j} (1 - \hat{F}(p_L))^j \right\},$$

then bidders with valuations that exceed $p_L$ are not induced to stay out of the auction. This step eliminates the reserve price as a decision variable from the process.

Next, the difference between the target total sample size $S_t$ and the total size of the samples collected prior to period t, $$\sum_{j=1}^{t-1} s_j,$$

is divided by the number of remaining time periods, T–t, to determine the size of the sample to be collected at period t.

The size of the sample to be collected at period t is indicated by the variable $s_t$. In the present embodiment, $s_t$ is determined using the equation $$s_t = \left( S_t - \sum_{j=1}^{t-1} s_j \right) / (T - t).$$

The number of auctions, the number of bidders per auction, the number of units per auction and the reserve price are then determined. In the present embodiment, these parameters are determined using the sample size $s_t$ and total quantity $q_t$ as inputs. Other inputs include the most recent estimate of F(.), indicated by the variable $\hat{F}(.)$, the most recent estimate of e, indicated by the variable $\hat{e}$, a price range [$p_L$, p], cost per auction ($C_A$), cost per bidder ($C_B$) and cost per unit sold ($C_Q$). The minimum expected net cost (ENC) represents the minimum expected net cost of collecting a sample of size s when the reserve price, the number of units per auction, the number of bidders per auction and the number of auctions are selected optimally under the given constraints and can be represented as ENC (s, q, $p_L$, $\hat{e}$, $\hat{F}(\cdot)$, $C_A$, $C_B$, $C_Q$).

Number of units may then be determined. If the number of bidders in the auction is n, the number of units offered in the auction, k, is determined to find the least-costly way of inducing $p_L$. This is achieved by selecting k to maximize the expected net revenue from auctioning k units among n bidders with a reserve price r (n, k, $p_L$, $\hat{e}$, $\hat{F}(.)$). Since a cost of $C_Q$ is incurred for each unit sold in the auction, the net-revenue maximizing number of units will depend on $C_Q$ as well as on other parameters of the process, that is on n, $p_L$, $\hat{e}$, $\hat{F}(.)$.

If S is the total sample size (number of bidders in all auctions conducted) and n bidders are invited in each auction then the number of auctions needed is S/n. If the total number of units available is restricted to be at most Q, and k units are offered for sale in each auction, then there is an additional constraint on the number of auctions, that is, A k<q. Thus, in order to ensure that both the sample size constraint and the quantity constraint are satisfied, the number of units per auction may be restricted to the range $1 \leq k \leq (q/s)n$.

When M (n, k, $p_L$) denotes the number of actual participants in an auction in which there are n invited bidders, k units for sale and the reserve price is selected to induce bidders with valuations greater than $p_L$ to participate in the auction. M (n, k, $p_L$) is a Binomial random variable with parameters n and (1–F($p_L$)):M (n, k, $p_L$) is distributed Binomial (n, 1–F($p_L$)).

It is noted that actual quantity sold in an auction with parameters (n, k, r) is Min {M, k}, which is random since M is random. The price per unit in such an auction is also a random variable. If M≤k, then M units are sold in the auction and the price for each of the M units sold is equal to the reserve price r. If M>k, then k units are sold in the auction and the price for each of the k units sold is equal to the (k+1)st highest bid among the M submitted bids. In this case, the price per unit exceeds the reserve price since $p_L > r$, and a bidder who chooses to submit a bid submits his valuation. Let $B_{k+1:M}$ denote the (k+1)st highest bid among the M submitted bids.

Denote by $\hat{e}$ and $\hat{F}(v)$ the current estimates of the unknowns e and F(v), respectively. Expected net revenue from sales in an auction with Mactual bidders is Exp_Net_Revenue (n, k, r, M|$\hat{e}$, $\hat{F}(\cdot)$, $C_Q$)=Min {M,k} {(r–$C_Q$)θ(M, k)+($\bar{B}_{k+1}$–$C_Q$)[1–θ(M, k)]} where θ (M, k)=1 if M←k, 0 otherwise. Let $E_M[.]$ denote the expectation with respect to the distribution of M. Using the estimated distribution of M, the expected net revenue is obtained from sales in an auction with the given parameters as:

$$\text{Exp\_Net\_Revenue}(n, k, r|\hat{e}, \hat{F}(.), C_Q) = E_M[\text{Exp\_Net\_Revenue}(n, k, r, M|\hat{e}, \hat{F}(.), C_Q)].$$

The value of k that maximizes Exp_Net_Revenue(n, k, r (n, k, $p_L$, ê, $\hat{F}(.))|\hat{e},\hat{F}(.), C_Q$) is denoted by k(n, $p_L$, ê,$\hat{F}(.), C_Q$)=arg max$_k$ Exp_Net_Revenue (n, k, r(n, k, $p_L$, ê, $\hat{F}(.))|\hat{e}, \hat{F}(.), C_Q$). The maximization may be obtained in when k is an integer between 1 and (Q/S)n and ExpNR(k*)=Exp_Net_Revenue(n, k, r(n, k, $p_L$, ê, $\hat{F}(.))|\hat{e}, \hat{F}(.), C_Q$) evaluated at k=k*.

Specifically, starting with an initial value for k:k*=k(0) =largest integer smaller than (n+1)/2 and solving using the following logic: If ExpNR(k(0)+1)≧ExpNR(k(0)) While {k(0)≦k*≦(q/s)n, ExpNR(k*+1)≧ExpNR(k*); k*=k*+1}. Else k(n, $p_L$, ê, $\hat{F}(.), C_Q$)=k* While {k(0)≧k*≧1, ExpNR (k*−1)≧ExpNR(k*); k*=k*−1}.

The number of bidders and number of auctions is then updated. In the present embodiment, the variables $C_A, C_B$, and $C_Q$ are used to denote the cost per auction, cost per bidder and cost per unit sold, respectively. Then k(n, $p_L$, ê, $\hat{F}(.), C_Q$) is substituted for k in the expression for:

$$\text{Exp\_Net\_Revenue}(n, k, r(n, k, p_L, \hat{e}, \hat{F}(.))|\hat{e}, \hat{F}(.), C_Q)$$

the expected net revenue is obtained as a function of the decision variable n and the parameters ($p_L$, $\hat{e}$, $\hat{F}(.)$, $C_Q$). The resulting function is then denoted by ENR(n, $p_L$, ê, $\hat{F}(.), C_Q$)=Exp_Net_Revenue (n, k, r(n, k, $p_L$, ê, $\hat{F}(.))|\hat{e}, \hat{F}(.), C_Q$) evaluated at k=k(n, $p_L$, ê, $\hat{F}(.), C_Q$). Therefore, the expected net cost of A auctions each with n bidders is:

$$\text{ENC A, n, } p_L, \hat{e}, \hat{F}(.), C_A A + C_B n A - A \text{ ENR } (n, p_L, \hat{e}, \hat{F}(.), C_Q).$$

When S is the desired sample size (the total number of bidders from all auctions), then the number of auctions, A, and the number of bidders per auction, n, are related by s=nA, or equivalently, A=s/n. The expected net cost of collecting a sample of size S with A auctions each with n bidders can be expressed in terms of a single decision variable n in the following equation:

$$\text{ENC}(n, s, q, p_L, \hat{e}, \hat{F}(.), C_A, C_B, C_Q) = C_A(s/n) + C_B n(s/n) - (s/n)\text{ENR}(n, p_L, \hat{e}, \hat{F}(.), C_Q) = s\{(C_A/n + C_B - \text{ENR}(n, p_L, \hat{e}, \hat{F}(.), C_Q)/n\}.$$

In the present embodiment, since n can take integer values in a finite range from 2 to MaxB (given by system constraints), the minimization of ENC(n, s, Q, $p_L$, ê, $\hat{F}(.)$), $C_A, C_B$, $C_Q$) may be done by complete enumeration. Once the value of n that minimizes ENC(n, s, Q, $p_L$, $\hat{e}$, $\hat{F}(.)$, $C_A, C_B, C_Q$) is determined, the desired number of auctions is obtained as A=s/n. Then the equation ENC(s, Q, $p_L$, ê, $\hat{F}(.), C_A, C_B, C_Q$) is used to denote the minimum expected net cost of collecting a sample of size s.

Additional auctions are then run using the updated auction parameters from step 522. The process of steps 506-522 then continues, with additional auctions conducted (step 506), budget, available quantity updated (step 508), auction participation cost determined (step 510), and the demand function updated (step 512) until the demand function meets the specified accuracy (step 514) or until the budget has been exceeded (step 518).

At the time of the first Vickrey auction, little is known about the probability distribution function F(v). In one embodiment, as additional auctions are run, more information becomes available and the people marketing the product are provided better knowledge of the demand function and can make decisions on the parameter of interest, such as number of items to offer, based on the value of F(v). If the value of F(v) is not considered good enough, additional auctions are run until F(v) is considered good enough as shown in step 514 (provided budget resources allow). If the desired accuracy of the function F(v) is reached within budgetary limits, a report is generated showing the joint distribution of bids in any or a combination of graphical, tabular or prose formats as shown in step 516.

Additionally, there are budgetary concerns that are to be met as shown in step 518. In the present embodiment, an auction budget, reflecting the amount of money that can be spent for the first Vickrey auction and all additional auctions, is pre-established. If the auction budget is exceeded before the demand function specifications are satisfied, the auctions are stopped and a report is generated, as shown in step 520, with the last determined demand function and a warning that the desired accuracy has not been reached.

Figure 6:
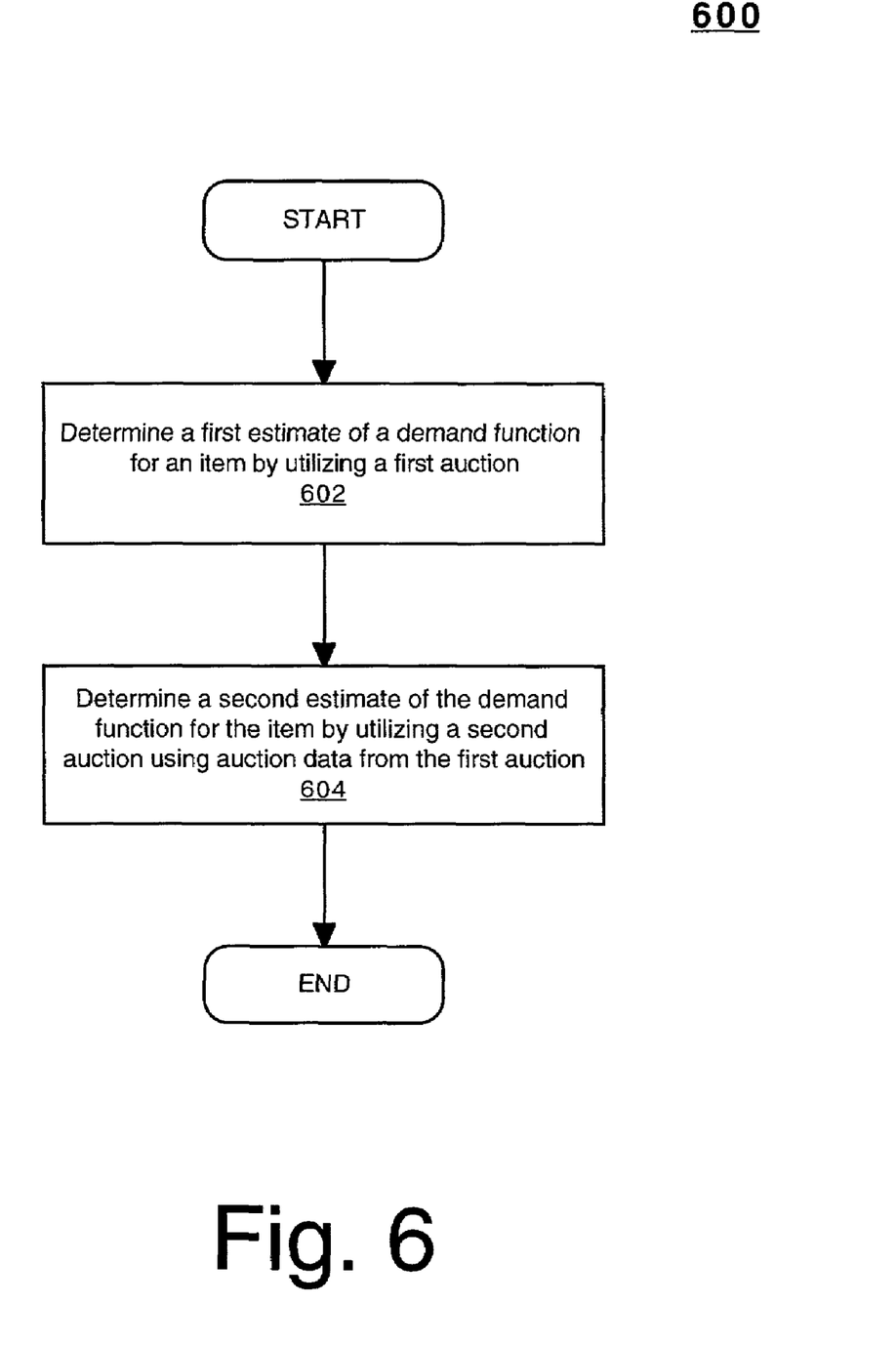
FIG. 6 is a flow chart diagram illustrating a method for determining an estimate of a demand function for an item in accordance with an embodiment of the present invention.

FIG. 6 is a flow chart diagram illustrating a process 600 for determining a demand function of an item in accordance with an embodiment of the present invention. Although specific steps are disclosed in process 600, such steps are exemplary. That is, the present embodiment is well suited to performing various other steps or variations of the steps recited in FIG. 6. It should be appreciated that the steps of process 600 may be performed by software, by hardware, by firmware, or by any combination of software, hardware and firmware.

At step 602, a first estimate of a demand function for an item is determined by utilizing a first auction having a first set of auction parameters. It is appreciated that the first estimate of the demand function for the item may be determined in a wide variety of ways in accordance with the present embodiment. For example, the first estimate of the demand function may be determined in any manner similar to that described herein. Furthermore, the first auction (having a first set of auction parameters) utilized to determine the first estimate of the demand function of step 602 may be any type of auction described herein and include any auction parameters described herein.

At step 604, a second estimate of the demand function for the item is determined by utilizing a second auction using auction data from the first auction. It is understood that the second estimate of the demand function for the item may be determined utilizing a second auction in diverse ways in accordance with the present embodiment. For example, the second estimate of the demand function may be determined in any manner similar to that described herein. Additionally, the second auction utilized to determine the second estimate of the demand function of step 604 may be any type of auction described herein. For instance, the second auction may have a second set of auction parameters based on the first estimate of the demand function. Furthermore, it is appreciated that the auction data from the first auction may be any type of auction data described herein utilized to determine the second estimate of the demand function.

It is noted that step 604 may be modified in accordance with the present embodiment. For example, in addition to the functionality of step 604 described herein, step 604 may also continue to determine a plurality of additional estimates of the demand function for the item by utilizing a plurality of additional auctions. It is appreciated that each of the additional auctions may have auction parameters based on the most recent determined estimate of the demand function. The additional auctions may be implemented in any manner similar to that described herein.

In summary, embodiments of the present invention provide a method and system thereof for test marketing and determining demand function for new products and existing products under new market conditions. This is achieved by running auctions that are designed for the specific purpose of efficient demand estimation. This method of the present invention avoids strong a priori assumptions about the unknown demand function and about bidding behavior in auctions and uses auctions as part of the data collection process designed specifically for efficient demand estimation.

In the foregoing specification, the invention has been described with reference to specific embodiments thereof. It will, however, be evident to those skilled in the art that various modifications and changes may be made thereto without departing from the broader spirit and scope of the invention. The specification and drawings are, accordingly, to be regarded in an illustrative rather than a restrictive sense.

What is claimed is:

1. A method for determining a demand function for an item comprising:

determining a first estimate of said demand function for said item by utilizing a first auction having a first set of auction parameters at an automated demand estimator computer system, said first auction controlling participant selection as well as quantities of said item offered in said auction and the timing and duration of said auction in order to obtain a first estimate of said demand function for said item wherein said first auction is a controlled auction that does not result in an actual sale of said item, wherein said first estimate of said demand function is obtained from a probability distribution function of bid values of said first action;

determining a second estimate of said demand function for said item by performing a second auction having a second set of auction parameters at said automated demand estimator computer system, said second auction controlling participant selection as well as quantities of said item offered in said second auction and the timing and duration of said second auction in order to obtain a second estimate of said demand function for said item wherein said second auction is a controlled auction that does not result in an actual sale of said item, wherein said second estimate of said demand function is obtained from a probability distribution function of bid values of said second action; and utilizing said first estimate of said demand function from said first auction and said second estimate of said demand function from said second auction to generate an overall estimate of said demand function for said item at said automated demand estimator computer system.

2. The method as described in claim 1, wherein said first auction and said second auction each comprises participants selected from a pool of auction participants that are representative of potential buyers of said item.

3. The method as described in claim 1, wherein said first and second auctions each comprise a Vickrey auction.

4. The method as described in claim 3, wherein said Vickrey auction is a sealed-bid-second price auction.

5. The method as described in claim 1, further comprising:

determining a plurality of additional estimates of said demand function for said item at said automated demand estimator computer system by utilizing a plurality of additional auctions, each of said additional auctions having auction parameters based on the most recent determined estimate of said demand function.

6. The method as described in claim 5, wherein said plurality of additional auctions comprises a Vickrey auction.

7. The method as described in claim 5, wherein said determining said plurality of additional estimates of said demand function is performed until said estimated demand function meets an accuracy criterion or until budget resources have been utilized.

8. The method as described in claim 7, wherein said budget resources are reflected by an auction budget, said auction budget reflecting the amount of money that can be spent for conducting said first auction and said second auction.

9. The method as described in claim 1, wherein said first and second set of auction parameters each include a number of items to sell at said first and second auctions, wherein said number of items to sell is determined to be the number of items that provides the maximum profit.

10. The method as described in claim 9, further comprising generating a graph at said automated demand estimator computer system that indicates the joint distribution of bids submitted during said first and second auctions.

* * * * *

UNITED STATES PATENT AND TRADEMARK OFFICE
CERTIFICATE OF CORRECTION

PATENT NO. : 7,702,564 B2  Page 1 of 1
APPLICATION NO. : 10/175661
DATED : April 20, 2010
INVENTOR(S) : Kemal Guler et al.

It is certified that error appears in the above-identified patent and that said Letters Patent is hereby corrected as shown below:

On the title page, item (75), Inventors, in column 1, line 2, delete "Tongw ei Liu," and insert -- Tongwei Liu, --, therefor.

On the title page, item (75), Inventors, in column 1, line 3, delete "Hsiu-Khuem Tang," and insert -- Hsiu-Khuern Tang, -- therefor.

In column 19, line 30, in Claim 1, delete "action;" and insert -- auction; --, therefor.

In column 19, line 43, in Claim 1, delete "action;" and insert -- auction; --, therefor.

Signed and Sealed this

Seventeenth Day of August, 2010

David J. Kappos
*Director of the United States Patent and Trademark Office*